United States Patent [19]

Astle

[11] 4,437,366
[45] Mar. 20, 1984

[54] TOOL CARRIER FOR PORTABLE LATHE

[75] Inventor: William H. Astle, Rancho Cordova, Calif.

[73] Assignee: Tri Tool, Inc., Rancho Cordova, Calif.

[21] Appl. No.: 250,680

[22] Filed: Apr. 3, 1981

[51] Int. Cl.³ .......................... B23B 3/22; B23B 29/00
[52] U.S. Cl. ..................................... 82/4 C; 82/36 R
[58] Field of Search ............... 82/4 A, 4 C, 4 D, 4 R, 82/2 E, 36 R, 24 R; 144/205; 279/123

[56] References Cited

U.S. PATENT DOCUMENTS

| | | |
|---|---|---|
| 587,093 | 7/1897 | French . |
| 1,115,277 | 10/1914 | Bodkin . |
| 1,674,372 | 6/1928 | Nonneman . |
| 2,194,686 | 3/1940 | Berggren . |
| 3,180,187 | 4/1965 | McFerren .............................. 82/2 E |
| 3,292,267 | 12/1966 | Wilterdink ............................ 82/2 E |
| 3,333,493 | 8/1967 | Bullard et al. ....................... 82/36 R |
| 3,604,293 | 9/1971 | Foll et al. ............................. 82/24 R |
| 4,257,289 | 3/1981 | Groothius ............................. 82/4 C |

FOREIGN PATENT DOCUMENTS 2839320  3/1980  Fed. Rep. of Germany ...... 279/123

*Primary Examiner*—E. R. Kazenske
*Assistant Examiner*—Paul W. Heyrana, Sr.
*Attorney, Agent, or Firm*—Bacon & Thomas

[57] ABSTRACT

A tool carrier for a portable lathe includes a tool slide (84) upon which tool holders (18) are mounted. The tool holders (18) are rigidly secured to the slide surfaces by means of clamps (20) that include male gibs (70) that engage female gibs in the tool holder and the tool carrier. The clamps (20) provide a bearing surface for guiding the tool carrier along the tool slide while also functioning to clamp the carrier relative to the slide when the clamp fasteners (80) are secured.

4 Claims, 4 Drawing Figures

TOOL CARRIER FOR PORTABLE LATHE

BACKGROUND OF THE INVENTION

1. Field of the Invention

This invention relates to an improvement in a machine tool such as, for example, a portable lathe for preparing pipe ends for welding, and in particular a tool holder for such a machine tool.

2. Prior Art

Tool holders for machine tools use various forms of slides for adjustably supporting a tool carrier on the tool slide in such a manner that the carrier can be moved along the slide in a precise manner and also can be rigidly secured thereto. It is conventional to configure the tool holder and the tool slide in such a manner that they engage each other along angular bearing surfaces called gibs, which actually form dovetail interlocking slide surfaces.

In a portable lathe machine tool, it is also common to place the tool holders on radially extending tool slides provided on a tool carrier that is rotatable about a cutting axis of symmetry. Such tool carriers are hollow and accommodate a pipe engaging mandrel that extends through the hollow portion of the tool carrier to engage the interior of a pipe to thereby secure the portable lathe in a selected position relative to the pipe end. The tool carrier is driven by a suitable motor and reduction gearing and means are provided to feed the tool carrier into engagement with the pipe end to carry out the pipe end preparation operation. In such portable lathes, it is usual practice to provide a beveling tool, a facing tool and a boring tool to respectively cut a bevel on the pipe end, square the end of the pipe and cut the interior of the pipe to a precise concentric end wall thickness.

It is desirable in such portable lathes to mount the tool carrier on the tool slide in a rigid, adjustable manner, whereby the tool carrier can be rigidly clamped to the tool slide during the cutting operation. Moreover, it is highly desirable to move the tool carrier along the tool slide for adjustment purposes. The requirements for precise location of the tool holder and rigid clamping of the holder to the tool slide requires special consideration of the problems involved. It is therefore an object of this invention to provide a special clamping arrangement between the tool holder and the tool slide of a portable lathe that permits the holder to be rigidly clamping to the tool slide while permitting the tool holder to be adjusted along the tool slide in a simple manner.

It is further an object of this invention to provide a clamping bracket for the tool holder that enables the holder to be rigidly clamped to the tool guide surface provided on the tool carrier.

It is further an object of the invention to provide a clamping arrangement for a tool carrier that is simple and inexpensive to construct.

BRIEF DESCRIPTION OF THE INVENTION

The invention is characterized in that a tool carrier and a tool holder of a portable lathe are both provided with female gibs that include bevel surfaces that slope towards each other. Clamping brackets with associated male gibs are secured by removable fasteners to the sides of the tool holders and span the distance between the female gibs. The male gibs engage the female gibs along the sloping surfaces and cause the tool carriers to be clamped against the surface of the tool slide when they are rigidly secured in place.

The tool carriers are furthermore provided with radially extending apertures arranged to engage threaded rods that are fixed to the tool carrier for rotary movement only. Rotation of the threaded rods enables the tool carriers to be accurately positioned radially along the tool slide surfaces of the tool carriers, but only after one clamping bracket has been loosened to relieve the clamping force between the tool carrier and the tool slide.

At least one of the tool carriers is provided with an undercut slot area extending along the tool slide surface for accommodating the end portion of an elongated tool secured in the tool holder. Movement of the tool holder along the slide surface can thus be accommodated without interference between the end of a tool mounted in the tool holder and the tool slide surface.

BRIEF DESCRIPTION OF THE DRAWINGS

With reference to the appended drawings.

DETAILED DESCRIPTION OF A PREFERRED EMBODIMENT OF THE INVENTION

Figure 1:
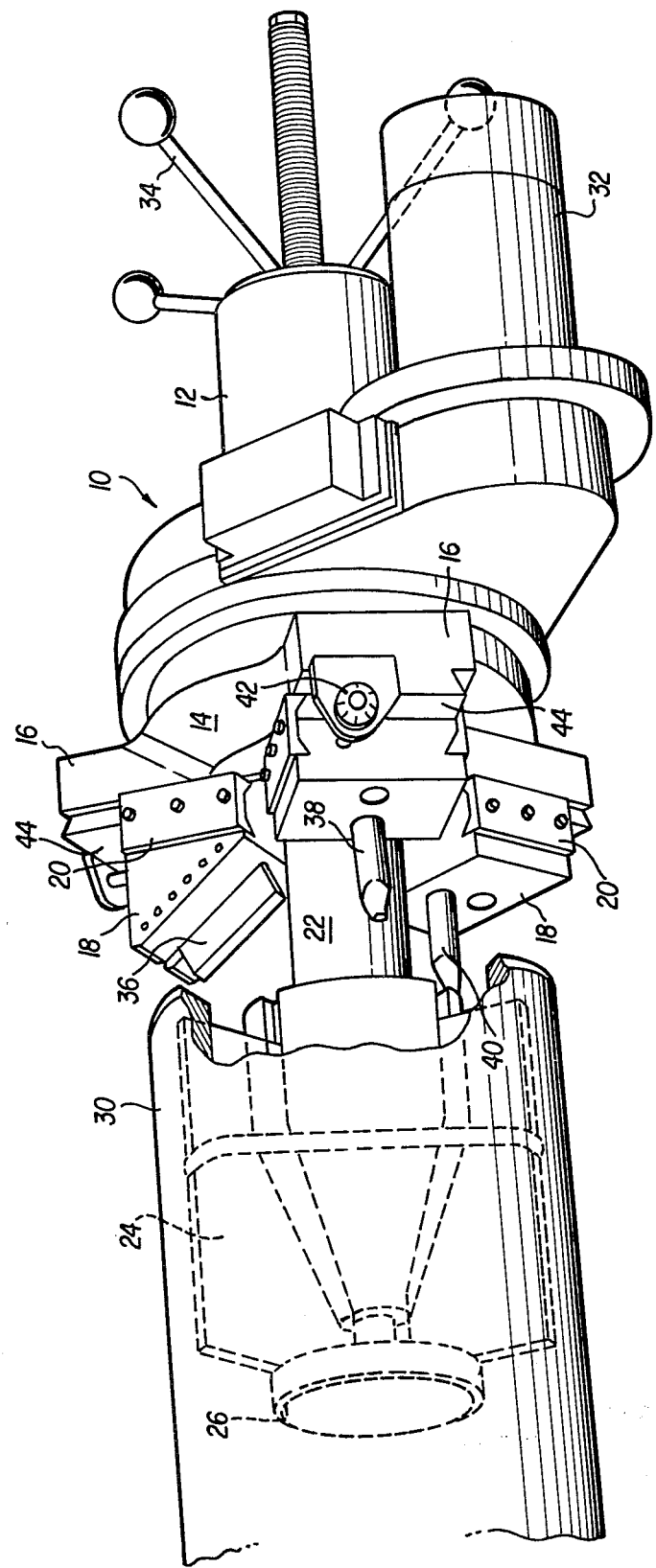
FIG. 1 is a perspective view of a portable lathe embodying the present invention.

With reference to FIG. 1, a portable lathe 10 includes a housing 12 to which is rotatably secured a tool carrier 14 including radially extending arms 16 to which are secured tool holders 18 by means of clamps 20 that will be described in more detail below.

Figure 4:
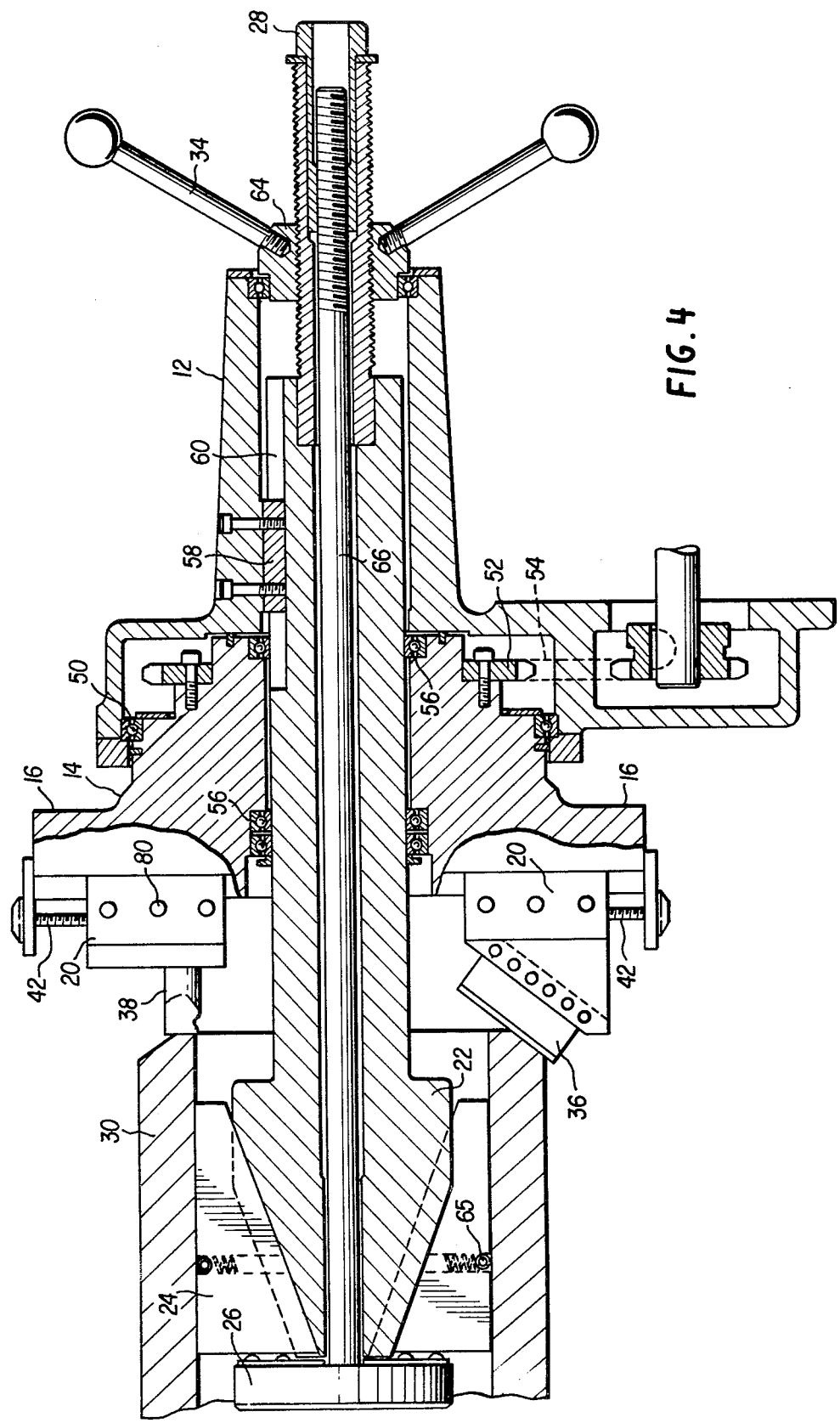
FIG. 4 is side sectional view of the tool carrier and an associated tool holder, showing the clamping arrangement in accordance with the present invention.

The tool carrier 14 is hollow and a mandrel shaft 22 extends through the housing 12 and the tool carrier 14 as will be evident from FIG. 4. The mandrel is fixed against rotation within housing 12 but can move axially relative to the housing to enable the housing and tool carrier 14 to be advanced along the mandrel shaft 22.

A set of mandrel blades 24 are positioned on the distal end of the mandrel shaft 22 and a mandrel actuator 26 is arranged to cause the mandrel blades to extend radially outwardly when the actuator is caused to move relative to the mandrel shaft by means of a draw bar extending coaxially within the mandrel shaft (see FIG. 4). The blades include cam follower surfaces that ride along cam surfaces provided on the mandrel shaft, all in a manner that is well known to the art. When the mandrel draw bar is pulled towards the mandrel by means of a draw bar nut 28, the blades are caused to extend radially outwardly to engage a pipe 30.

When the tool carrier is driven in rotation by motor 32, rotation of the feed handle 34 causes the housing 12 to advance along the mandrel shaft 22 and the cutting tools, namely a beveler 36, a facing tool 38 and a boring bar 40, to machine the end of the pipe 30 in preparation for a welding operation.

The tool holders 18 each can be adjusted in a radial sense along the tool carriers 14 by means of threaded adjustment screws 42 that are secured to the outer ends of the radial arms 16. Release of one of the clamps 20 is required to adjust the tool holders 18 by means of the screws 42. Usually, only the clamp 20 that is located on that side of the tool holder that receives the "down" force from the machining operation needs to be loosened for adjustment purposes.

Figure 2:
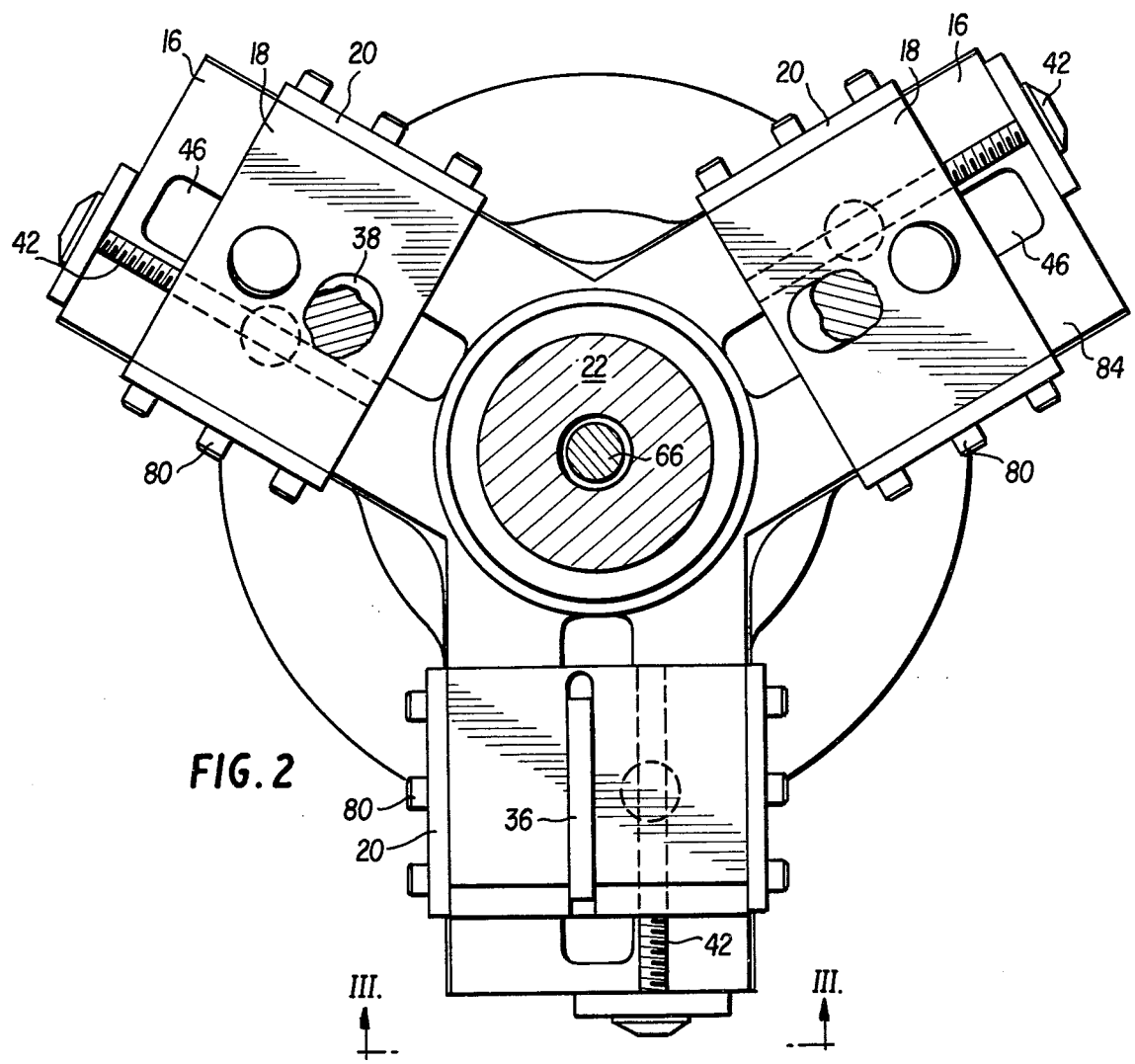
FIG. 2 is an end view of the tool carrier showing the associated tool holders.

Referring to FIG. 2, the tool carrier 14 is shown in an end view which clearly illustrates the relationship between the adjusting screws 42 and the tool holders 18. It will be noted that two of the arms 16 that carry the tool holders to which are secured the facing and boring tools 38, 40, respectively, are provided with undercut slot areas 46 that extent along the arm 16. The purpose of the slots 46 is to permit the elongated tools 38, 40 to extend beyond the bottom of the respective tool holers without interference with its respective tool carrier slide surface 44, as is better illustrated in FIGS. 3 and 4. The relationship between the housing 12, the tool carrier 14 and the mandrel is best seen in FIG. 4 which also shows the driving arrangement between the motor and the carrier 14. Thus, it is seen that the carrier 14 is mounted by means of bearing 50 within the housing 12 and is driven by motor 32 through gearing 52 and a chain 54 that extends over the gearing 52. The mandrel shaft 22 is supported within the carrier by bearings 56 and is keyed to the housing at 58. A keyway 60 extends along the mandrel shaft at the end thereof within the housing 12 and engages the key 58 to prevent rotation of the mandrel shaft 22 relative to the housing 12.

A feed handle 34 is connected to a feed nut 64 that is threadedly connected to a mandrel shaft 22 whereby the mandrel shaft can be axially moved relative to the housing 12 by rotation of the handle 62.

The mandrel actuator 26 is connected to the mandrel draw bar 66 which actually extends the full length of the lathe tool. The opposite end of the draw bar is threadedly secured to a mandrel actuating means 28, which, when turned, causes the draw bar to move the mandrel actuator axially relative to the mandrel shaft 22. Axial movement of the mandrel actuator 26 causes radial movement of the mandrel blades 24, as previously described, which blades are retracted by a spring means 65.

Figure 3:
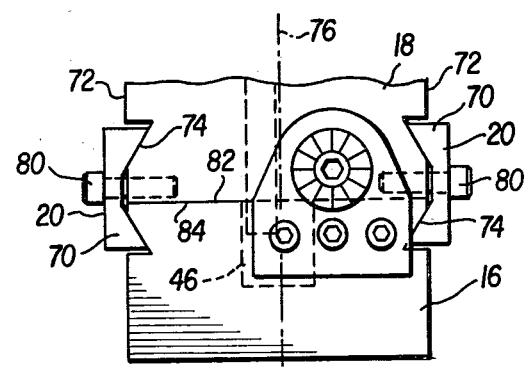
FIG. 3 is an end view taken along line III—III in FIG. 2.

The tool carriers 18 are secured to the tool carrier arm 16 by means of clamps 20 that are illustrated in FIGS. 2 and 3. As seen in FIG. 3, the clamps 20 constitute elongated bracket members that are provided with male beveled gibs 70 that engage correspondingly shaped female gibs in the side edges 72 of the tool holders 18. The female gibs in the tool holder 18 extend parallel to the female gibs in the tool carrier arm 16 and the clamp 20 extends between the female gibs in the tool holder and the tool carrier arms. The gibs all include sloping surfaces 74 that slope outwardly from the central axis 76 of the tool holder 18 and the arm 16 towards the abutting tool holder and tool slide surfaces. Thus, the male gibs on the clamp 20 engage the bevel surfaces 74 when fasteners 80 are tightened to secure the clamps 20 to the tool holders 18. Suitable clearances as illustrated in FIG. 3 between the clamp, the tool holder and the radial arm are provided to allow for wear between the parts. Thus, when the clamps 20 are secured to the tool holders 18 by means of the fasteners 80, the bottom surface 82 of the tool holder is pressed into engagement with the tool slide surface 84 to rigidly lock the tool holder 18 relative to the arm 16.

The relationship between the boring tool 40, the tool holder 18, and the radial arm 16 is evident from FIG. 3, wherein it will be seen that the inner end of the tool 40 extends through an aperture in the tool holder 18 and beyond the bottom surface 82 of the tool holder into the area of the undercut slot area 46 in the tool carrier 16. This permits a wide range of adjustment of the tool 40 in an axial sense, that is, towards and away from the pipe end being machined.

The clamping arrangement according to the present invention permits the radial arm 16 and the tool holders 18 to be manufactured by carrying out routine and simple machining operations without a requirement for maintaining careful tolerances. The clamps 20 likewise can be produced in quantity at minimum cost without the requirement for maintaining close tolerances, except that the gib surfaces must all interfit in close relationship. When the parts are assembled as shown in FIG. 3, it will be seen that a rigid, secure clamping relationship is obtained between the tool holder 18 and the tool carrier arm 16 to prevent undesired relative movement between the carrier and the work holder.

If it is desired to rapidly adjust the tool holder 18 along the radial arm 16, it is only necessary to release at least one of the clamps 20 associated with the particular tool holder to be adjusted, whereupon the tool holder can be easily positioned along the tool slide surface of the radial arm 16.

The foregoing description is of a preferred embodiment only of the invention and it will be evident to anyone skilled in the art that other specific structural configurations could be used in place of those illustrated in the preferred embodiment. Accordingly, the invention is not considered to be limited to the structure described herein, but is intended to extend to the full scope of the claims set forth below.

I claim:

1. In a portable lathe for preparing pipe ends for welding including a hollow tool carrier rotatable about a longitudinal cutting axis of symmetry; a mandrel shaft extending axially through the tool carrier; a pipe engaging mandrel on the distal end of said mandrel shaft; means for expanding the mandrel into a pipe engaging position to secure the lathe in an adjustably set location relative to a pipe end; said tool carrier rotatable relative to said mandrel shaft and moveable towards and away from the distal end of the mandrel; the improvement comprising:

said tool carrier comprising three radially extending circumferentially spaced arms each including a flat tool slide facing towards a pipe end position; each tool slide including a tool holder slide surface; a clamp means for releasably securing a tool holder to the slide surface; each tool slide including parallel opposed female bevel gibs extending along the side edges of the tool slide to form a dovetail tool slide; each tool holder connected to a respective tool slide including upstanding side edges extending normal to the respective tool slide surface parallel to the side edges of the tool slide, and a tool slide engaging bottom surface; each tool holder including female bevel gibs in its upstanding side edges extending parallel to the gibs in the sides of a respective associated tool slide; each clamp means comprising a pair of gibs brackets removably secured to the opposite side edges of a respective tool holder and including male bevel gibs at its opposite edges, said brackets each spanning the distance between respective female gibs in a tool slide and associated tool holder; said gibs all including a bevel surface inclined from the center line of a respective tool slide and tool carrier extending toward the outer edges of the slide and carrier towards the abutting tool holder and tool slide surfaces; said male gibs being complementary in form to the female gibs and arranged to engage the female gibs in camming relationship along the bevel surfaces to thereby cause clamping together of a respective tool holder bottom surface and an associated tool slide when they are in assembled position; each tool holder including a first aperture extending parallel to its respective tool slide and parallel to the tool holder side edges, and means therein for engaging the threads of a threaded shaft; a rotatable threaded shaft extending through each said aperture, each shaft being retained in fixed axial position relative to a tool slide to which it is connected; and means for rotating each shaft to move each tool holder relative to and parallel with its respective tool slide when at least a single gib bracket associated therewith is loosened from its clamping position; at least one of said tool slides including an elongated undercut slot area in its slide surface extending along its length; the respective tool holder associated with said tool slide including the slot area including a second aperture extending normal to said first aperture and terminating at its bottom surface opposite said undercut slot area, said second aperture being adapted to receive an elongated cutting tool; whereby said undercut area prevents interference between said tool slide and a cutting tool that is positioned in said second aperture so as to extend beyond the bottom surface of the respective tool holder.

2. In a machine tool having a tool carrier and a tool holder wherein the tool carrier includes at least one dovetail tool slide having a tool holder slide surface and parallel, opposed first female bevel gibs extending along its side edges, the improvements comprising: (a) a tool holder having a tool slide engaging bottom portion including upstanding opposite side edges extending parallel to the first female bevel gibs and normal to the slide surface, the side edges of the tool holder defining second female bevel gibs extending parallel to the first female bevel gibs, the tool holder further defining a first aperture extending along, and parallel to the side edges, and the tool slide surface; (b) clamp means for releasably clamping the tool holder to the tool carrier including a pair of clamps removably secured to the opposite sides of the tool holder, each of the clamps having a pair of male bevel gibs complementary to the first and second female bevel gibs at its opposite edges located such that one of the pair of male bevel gibs engages the first female bevel gib on the tool carrier while the other of the pair of male bevel gibs engages the second female gib on the tool holder, all of the gibs including a bevel surface inclined from the central area of the tool slide and tool carrier towards the outer edges of the tool slide and tool carrier, and towards their abutting surfaces such that the wedging force caused by interengagement of the male and female bevel gibs urges the bottom portion of the tool holder into contact with the tool holder slide surface; (c) a rotatable threaded shaft extending through the first aperure defined by the tool holder and rotatably attached to the tool carrier; and (d) means in the aperture defined by the tool holder forengaging the threads of the threaded shaft such that, when at least one clamp is released, as the shaft is rotated the tool holder will move relative to and parallel with the tool slide surface of the tool carrier.

3. A machine tool having a tool carrier and a tool holder as recited in claim 2, wherein the tool slide includes an undercut elongated slot area in the tool holder slide surface, said slot area extending parallel to the length of the tool slide; and wherein the tool holder includes a second aperture extending normal to said first aperture and terminating on the bottom surface of the tool holder opposite said undercut area, said second aperture being adapted to receive an elongated cutting tool, whereby said undercut area prevents interference between said tool slide and a cutting tool positioned in the tool holder so as to extend beyond its bottom surface.

4. A machine tool having a tool carrier and a tool holder as recited in claim 3, wherein the tool carrier comprises at least one radial arm rotatable about a cutting axis of symmetry disposed near one end of the arm, said tool slide facing axially along said cutting axis.

* * * * *